United States Patent [19]

Sudani et al.

[11] Patent Number: 5,158,828

[45] Date of Patent: Oct. 27, 1992

[54] CARBON/METAL COMPOSITE

[75] Inventors: Kiyoshi Sudani, Ibaraki; Masato Kano, Chiba; Yukihiro Sugimoto, Ibaraki; Takashi Fukuda, Kobe; Toru Iwahashi, Yamato-Koriyama, all of Japan

[73] Assignee: Sumitomo Metal Industries, Ltd., Osaka, Japan

[21] Appl. No.: 422,898

[22] Filed: Oct. 17, 1989

[30] Foreign Application Priority Data

| Oct. 17, 1988 | [JP] | Japan | 63-262110 |
| Dec. 13, 1988 | [JP] | Japan | 63-315611 |
| Dec. 13, 1988 | [JP] | Japan | 63-315612 |
| Dec. 13, 1988 | [JP] | Japan | 63-315613 |
| Dec. 13, 1988 | [JP] | Japan | 63-315614 |
| Apr. 12, 1989 | [JP] | Japan | 1-93842 |
| Jun. 26, 1989 | [JP] | Japan | 1-162891 |
| Jun. 26, 1989 | [JP] | Japan | 1-162892 |
| Jun. 26, 1989 | [JP] | Japan | 1-162893 |
| Jun. 29, 1989 | [JP] | Japan | 1-167320 |
| Aug. 14, 1989 | [JP] | Japan | 1-209771 |

[51] Int. Cl.$^5$ .............................................. B22F 7/01
[52] U.S. Cl. .................................. 428/368; 428/221; 428/242; 428/295; 428/302; 428/364; 428/408; 428/548; 428/549; 428/554; 428/560; 501/87; 501/95; 501/99
[58] Field of Search ............. 428/408, 548, 554, 549, 428/560, 242, 364, 368, 221, 295, 302; 501/87, 95, 99

[56] References Cited

U.S. PATENT DOCUMENTS

| 4,123,596 | 10/1978 | Robinson | 429/104 |
| 4,581,263 | 4/1986 | Lukas | 428/295 |
| 4,725,677 | 1/1989 | Gray | 428/269 |
| 4,761,206 | 8/1988 | Forrest | 204/9 |
| 4,799,957 | 1/1989 | Vogel | 75/243 |
| 4,892,790 | 1/1990 | Gray | 428/408 |
| 4,894,286 | 1/1990 | Gray | 428/366 |
| 4,928,645 | 5/1990 | Berneburg et al. | 251/368 |
| 4,952,440 | 8/1990 | Sanmartin et al. | 428/116 |

FOREIGN PATENT DOCUMENTS

| A2212666 | 6/1989 | European Pat. Off. . |
| 57-155336 | 9/1982 | Japan . |
| 58-135647 | 8/1983 | Japan . |
| 60-096742 | 5/1985 | Japan . |
| 61-294228 | 12/1986 | Japan . |
| 1-38227 | 2/1989 | Japan . |
| 1-111830 | 4/1989 | Japan . |
| 1-252741 | 10/1989 | Japan . |
| 1-294583 | 11/1989 | Japan . |
| 2-55737 | 2/1990 | Japan . |

OTHER PUBLICATIONS

Chemical Abstracts, vol. 107, No. 21, Nov. 23, 1987, p. 363, Abstract No. 204001p.
Chemical Abstracts, vol. 107, No. 1, Jul. 6, 1987, p. 293, Abstract No. 11891v.
Chemical Abstracts, vol. 81, No. 22, Dec. 2, 1974, p. 199, Abstract No. 139411a.

Primary Examiner—George F. Lesmes
Assistant Examiner—Beverly A. Pawlikowski
Attorney, Agent, or Firm—Burns, Doane, Swecker & Mathis

[57] ABSTRACT

An improved carbon/metal composite is disclosed which comprises a carbon matrix and metal fibers distributed in the carbon matrix. The improvement is that the metal fibers are selected from (A) metal fibers in which the surfaces of at least a portion of the fibers are coated or alloyed with another material which has a tendency to form carbides which is equal to or lower than that of the metal constituting the metal fibers, (B) metal fibers comprising at least two different types of metal fibers which differ with respect to their dimensions and/or material, and (C) metal fibers distributed in the carbon matrix in such a manner that their content varies along the thickness of the composite, thereby imparting to the composite improved properties with respect to at least one of mechanical strength, impact resistance, wear resistance, and electric conductivity.

18 Claims, 1 Drawing Sheet

CARBON/METAL COMPOSITE

BACKGROUND OF THE INVENTION

This invention relates to a carbon/metal composite. More particularly, it relates to a carbon/metal composite having a high strength, good wear resistance, and good electrical properties and which is suitable for use as a sliding current collector such as a pantograph slider for electric trains.

In the past, carbon materials and metallic materials such as cast alloys and sintered alloys have been employed for sliding current collectors. Metallic materials have the advantages of high strength and good electrical conductivity, but they have the drawbacks that they produce many arcs, their sliding properties are inadequate, and they produce a great deal of wear in the trolley wires or third rails with which they are in a sliding contact. Carbon materials have excellent lubricating properties and produce little wear of the wires or rails which they contact, but they have a high electric resistance and easily heat up during current collection.

The power consumption of railroad cars has been increasing due to higher train speeds and the installation of air conditioning. In order to cope with the increased power consumption, in recent years, sliding current collectors have begun to be made from carbon/metal composites, which combine the excellent sliding properties of carbon with the electrical conductivity of metals.

Japanese Published Examined Patent Application No. 56-14732 (1981) discloses a carbon/metal composite which is formed by impregnation under pressure of a metal into the pores of a carbon material.

Japanese Published Unexamined Patent Application No. 60-238402 (1985) discloses a current collecting material made from a carbon material containing metal powder which is obtained by adding a metal powder with good conductivity to a carbon raw material.

Japanese Published Unexamined Patent Application No. 61-245957 (1986) discloses a manufacturing method for a current collecting material in which a mixture of a carbon aggregate with a binder which contains metal fibers and/or carbon fibers is molded and baked, after which the baked body is impregnated with a metal.

Japanese Published Unexamined Patent Application No. 62-72564 (1987) discloses a manufacturing method for a sliding current collecting material in which metal fibers are blended into a carbon raw material, and the blend is molded at ambient temperature and then baked.

Japanese Published Unexamined Patent Application No. 62-197352 (1987) discloses a manufacturing method for a sliding current collecting carbon material in which metal fibers are blended with a carbon raw material so as to be oriented unidirectionally, after which molding and baking are performed.

Japanese Published Unexamined Patent Application No. 63-215731 (1988) discloses a manufacturing method for a carbon/metal composite frictional material for use in brakes in which pitch, metal fibers, and graphite are mixed and then molded at a temperature of 450°-600° C. under a molding pressure of at least 40 kg/cm$^2$.

However, the great majority of carbon/metal composites produce a great deal of wear of sliding contact with trolley wires, normally made of copper, when the surfaces of the wire are in a roughened condition. Such a roughened surface of trolley wires will be usually observed while pantograph sliders formed of a sintered metal which are at present prevailing is being replaced by those of a carbon/metal composite in the future, i.e., during a period when sliders of these two types are used concurrently.

Furthermore, most of the conventional carbon/metal composites are inferior to conventional metal sliders with respect to bending strength and impact strength. It is easy for sliders made from carbon/metal composites to be chipped or broken by collision with a hanger ear of a trolley wire which has been detached due to vibration or shock caused by running trains or any other accidental cause, so they are less safe and less reliable than conventional metal sliders.

Furthermore, carbon/metal composites have a higher electric resistance than conventional metal sliders. A high electric resistance leads to an increase in the temperature of trolley wires due to Joule heating. The temperature increase is particularly significant when a train is stopped but the air conditioning and interior lighting of the train are still operating. A high temperature may cause the breakage of the trolley wires under high tension, which is extremely dangerous.

It is possible to improve the strength and electrical properties of a carbon/metal composite by increasing the metal content of the composite. However, as the metal content is increased, more sparks are generated between the slider and the trolley wires, and the wear of the trolley wires and the slider is increased, which is undesirable.

SUMMARY OF THE INVENTION

Accordingly, it is an object of the present invention to provide a carbon/metal composite having a good mechanical strength such as bending strength and impact strength, as well as good wear resistance.

It is another object of the present invention to provide a carbon/metal composite suitable for use as pantograph sliders which has a good mechanical strength, good wear resistance, and a low electric resistance and which does not generate many sparks when in moving contact with a trolley wire.

It is still another object of the present invention to provide a carbon/metal composite which is minimized in wear loss when it is in sliding contact with a trolley wire having a roughened surface.

It is a further object of the present invention to provide a method for the manufacture of a carbon/metal composite having the above-described properties.

Other objects as well as the nature and the advantages of the present invention will be apparent from the following description.

In one aspect of the invention, there is provided an improved carbon/metal composite comprising a carbon matrix and metal fibers distributed in the carbon matrix. The improvement is that the metal fibers are selected from (A) metal fibers in which the surfaces of at least a portion of the fibers are coated or alloyed with another material which has a tendency to form carbides which is equal to or lower than that of the metal constituting the metal fibers, (B) metal fibers comprising at least two different types of metal fibers which differ with respect to their dimensions and/or material, and (C) metal fibers distributed in the carbon matrix in such a manner that their content varies along the thickness of the composite, thereby imparting to the composite improved properties with respect to at least one of mechanical strength, impact resistance, wear resistance, and electric conductivity.

In another aspect, there is provided a method for manufacturing a carbon/metal composite which comprises: forming a molding mixture comprising a carbon raw material and at least one component selected from (a) metal fibers at least a portion of which are coated with another material having a tendency to form carbides which is equal to or lower than that of the metal constituting the metal fibers, (b) metal fibers at least a portion of which have surfaces alloyed with another metal having a tendency to form carbides which is equal to or lower than that of the metal constituting the metal fibers, and (c) a mixture of metal fibers and a metal powder, said metal powder having a tendency to form carbides which is equal to or lower than that of the metal constituting the metal fibers; molding the molding mixture to form a molding; and baking the molding to carbonize the carbon raw material, thereby forming a carbon/metal composite.

If desired, the metal fibers can be oriented in a substantially unidirectional manner. Unidirectional orientation or alignment of the metal fibers further lowers the electric resistance and increases the impact strength of the composite.

DESCRIPTION OF THE PREFERRED EMBODIMENTS

Figure 1:
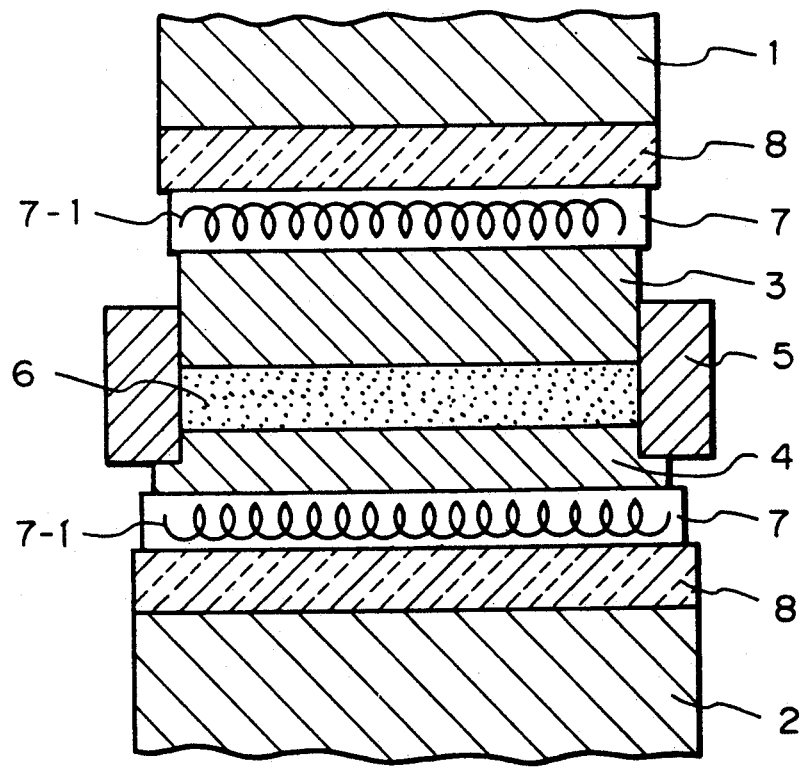
FIG. 1 is a schematic view of a molding apparatus which can be employed for manufacturing a carbon/metal composite according to the present invention.

A carbon/metal composite according to this invention has metal fibers distributed in a carbon matrix. It is manufactured by preparing a molding mixture which comprises a carbon raw material and metal fibers, molding the mixture, and then baking the resulting molding to carbonize the carbon raw material.

Various carbon raw materials can be employed to form a carbon/metal composite according to this invention. Some examples are (1) a self-sintering mesophase powder, (2) a binary raw material which is a mixture of a carbonaceous aggregate such as coke powder with pitch which functions as a binder, and (3) a carbonizable thermosetting resin such as a phenolic resin.

From the standpoint of wear resistance, the carbonaceous aggregate in the binary raw materials is preferably a hard carbonaceous carbon material such as coke powder which can be obtained by carbonizing pitch or coal at around 1000° C. or an isotropic carbon powder which can be obtained by carbonizing a phenolic resin.

From the standpoints of strength and wear resistance, the carbonaceous aggregate is ground to a particle size of preferably at most b 50 $\mu$m and more preferably at most 20 $\mu$m.

The pitch which is employed as binder can be coal tar pitch, or pitch with a high softening point which is obtained by heating coal tar pitch.

The pitch preferably has fluidity when heated. Furthermore, in order to increase the strength and wear resistance of the resulting composite, the volatile content of the pitch is preferably as low as possible.

When the composite is to be used for a pantograph slider, a binary carbon material comprising the above-described hard carbonaceous aggregate and pitch as a binder as primary components is desirable from the standpoints of cost and performance.

The metal fibers can be formed by a variety of methods, such as by the thin sheet slicing method, the chatter vibration cutting method, the wire cutting method, or by drawing. The shape of the individual metal fibers is not critical. For example, they can be rod-shaped, needle-shaped, wedge-shaped, wave-shaped, net-shaped, or a mixture of fibers having the above shapes.

There is not particular restriction of the material used for the metal fibers. The fibers can be steel fibers manufactured from common steel, high tensile steel, stainless steel, and the like. Metals other than steel can also be used, such as copper. Steel fibers made from low-carbon steel exhibit the best properties. The presence of manganese or chromium in steel fibers promotes cementation of the steel, which decreases the strength of the resulting composite. Therefore, the content of these elements is preferably as low as possible.

The dimensions of the metal fibers are not critical, but from the standpoint of obtaining a strong molding, the diameter of the fibers is preferably at most 0.5 mm and more preferably at most 0.3 mm. The fiber length is preferably at least 1 mm and more preferably at least 3 mm. Strictly the diameter of a fiber should be expressed as the equivalent diameter that is the diameter of a circle having the same cross-sectional area as the fiber.

As will be described in greater detail further on, when using two or more types of metal fibers having different dimensions, it is possible for some of the fibers to have a diameter of up to around 1 mm. Generally, the aspect ratio of the metal fibers (the ratio of fiber length to fiber diameter) is preferably at least 10. Although extremely elongate fibers having an aspect ratio exceeding 100 may be used, they tend to become entangled when blending with a carbon raw material. Therefore, if they are used, it is preferred that the amount of these fibers be not so large.

There is no particular restriction on the amount of the metal fibers. In order to improve the wear resistance, mechanical strength, and electric conductivity of the resulting composite, it is preferable that the metal fibers be present in an amount of at least 10 volume % in the composite. A larger amount of metal fibers on the order of 50 to 60 volume % may be employed, although the presence of metal fibers in an amount exceeding about 50 volume % tends to produce many sparks when the composite is used as a pantograph slider, thereby increasing the wear rate of the composite. Preferably the amount of the metal fibers is in the range of from 10 to 40 volume %, and more preferably in the range of from 15 to 35 volume % of the composite.

The present inventors discovered that the reason why conventional carbon/metal composite sliders having a low bending strength is that during the baking stage of manufacture of the composite, the metal fibers are carburized by the surrounding pitch and carbon powder, and metal carbides are formed in the fibers. For example, steel fibers are converted into a composition containing a large amount of cementite ($Fe_3C$). The carburization to form a metal carbide may be hereunder referred to as cementation.

Carburization or cementation of metal fibers such as steel fibers does not occur to a great extent at a baking temperature of less than 900° C. However, the baking stage in which the carbon raw material is carbonized to form a carbon matrix is normally performed in the vicinity of 1000° C. so that the resulting carbon matrix can fully exhibit their strength, and at this temperature, cementation of the fibers is greatly accelerated. The cementite which is formed by cementation of steel fibers is hard and brittle. A composite containing fibers of cementite has good wear resistance, but its toughness is low, and the bending strength is significantly decreased. Therefore, it is desirable to suppress cementation of the metal fibers during baking.

The present inventors discovered that the following measures are effective for suppressing cementation of metal fibers such as steel fibers.

(1) Prior to molding, if the surfaces of steel fibers are coated with another material such as copper, nickel, cobalt, aluminum, or silicon which has a tendency to form carbides which is equal to or lower than iron, the cementation of the steel fibers can be suppressed significantly, and the strength of the resulting composite can be greatly increased.

(2) Even if the steel fibers are not coated, if a metal powder mainly comprising a metal with such a low tendency to form carbides is added to the steel fibers, the cementation of the steel fibers can be suppressed.

(3) The cementation of steel fibers can also be suppressed by alloying at least the surfaces of the steel fibers with another metal having a low tendency to form carbides.

(4) If the surfaces of only a portion of the steel fibers are coated or alloyed with such a material having a low tendency to form carbides, the cementation of steel fibers can be substantially suppressed.

According to one embodiment of the present invention, the surfaces of at least a portion of the metal fibers which are present in the composite are coated or alloyed with another material which has a tendency to form carbides which is equal to or lower than the metal fibers, thereby imparting improved mechanical strength to the carbon/metal composite.

The coating of metal fibers can be applied by any conventional method such as vapor deposition, but typically, it is applied by non-electrolytic plating. Cementation of the metal fibers can be effectively suppressed even if the coating has a thickness of only 0.1 $\mu$m. There is no exact upper limit on the thickness of the coating, but from the standpoint of economy, a thickness of at most 10 $\mu$m is generally suitable. The thickness is preferably 0.1-5 $\mu$m and more preferably 0.2-2 $\mu$m.

Any material which has a tendency to form carbides which is equal to or lower than the metal constituting the metal fibers can be used as a coating material. When the resulting composite is to be used as a pantograph slider, both excellent resistance to cementation and a low electric resistance are necessary, so the coating material is preferably a metal. When the metal fibers are steel fibers, preferred coating materials are such metals as copper, nickel, cobalt, aluminum, and silicon. If the coating material has a high electric resistance, the metal fibers will be prevented from improving the conductivity of the composite, so the electric resistance of the composite becomes extremely high, and the composite will be unsuitable for use as a pantograph slider.

However, when the composite is to be used as a brake material or other type of sliding member which does not carry current, the conductivity is not important, and ceramics such as alumina, silicon carbide, and silica which has a high electric resistance can be employed as a coating material. A coating of a ceramic can be applied by any suitable technique such as plasma spray coating.

When the surfaces of metal fibers are coated with a material having a low tendency to form carbides, the cementation of the metal fibers is effectively suppressed during the baking stage. As a result, the strength, and particularly the bending strength, of the resulting composite is greatly increased.

For this purpose, of course, it is possible to coat the surfaces of all the metal fibers with another material as above. However, while surface coating increases the bending strength of a composite, it decreases the amount of cementite formed in the fibers, which due to its hardness increases the wear resistance of the composite. Therefore, coating all the metal fibers tends to decrease the wear resistance of the resulting composite.

This decrease in the wear resistance can be prevented if a portion of the metal fibers have uncoated surfaces. The uncoated metal fibers react with carbon in the surrounding carbon raw material during baking and form cementite which has excellent wear resistance. As a result, a composite can be obtained which has good bending strength without sacrificing wear resistance.

When coated and uncoated metal fibers are used together, there is not particular limit on the ratio of coated to uncoated fibers. However, cementite can greatly improve wear resistance even when present in only a small quantity. Therefore, in order to maintain a good bending strength, it is desirable to use a large amount of coated metal fibers. The coated metal fibers preferably constitute at least 50 weight % and more preferably at least 65 weight % of the total amount of metal fibers.

The cementation of the metal fibers during the baking stage can also be effectively suppressed by adding to the carbon raw materials a powder of a metal which has a tendency to form carbides which is equal to or lower than the metal fibers. As a result, the strength of the composite can be increased.

Useful metal powder can be formed from any metal having such a low tendency to form carbides. When the metal fibers are steel fibers, suitable metal powders include those formed from copper, nickel, aluminum, cobalt, and silicon.

The element distribution of a carbon/metal composite which was prepared from a molding mixture containing a metal powder was investigated using an electron probe micro analyzer (EPMA). Elements of the metal powder were found inside the metal fibers. When X-ray diffraction analysis was performed, almost no cementite was found. These results show that when the molding is baked to carbonize the carbon raw material, the metal powder added is spread into the metal fibers to form an alloy at least near the surfaces of the fibers, and the cementation of the metal fibers is thereby prevented.

When the metal powder is formed from a metal such as manganese of chromium which has a great tendency to form carbides, the strength of the resulting carbon/metal composite is decreased as compared to a composite to which no metal powder is added. The reason for this decrease in strength is that cementation is accelerated, resulting in a decrease in the strength of the metal fibers themselves. Furthermore, voids are formed between the metal fibers and the carbon matrix, causing a decrease in the bond strength between the fibers and the matrix.

The metal powder may contain one or more elements which have a tendency to form carbides equal to or lower than the metal fibers. When it contains more than one of such elements, the powder may be made of an alloy of these elements, or it may be a mixture of the respective metal powders of these elements.

The purity of the metal powder is not critical unless it contains a large amount of undesirable elements such as manganese or chromium. Thus, any metal powder may be used which contains a major amount of a metal having a low tendency to form carbides. For example, an alloy such as ferronickel can be employed.

The average particle size of the metal powder is preferably at most 100 μm and more preferably from 0.5 to 50 μm. If the average particle size is greater than 100 μm, cracks can easily form in the periphery of the metal particles. Furthermore, the number of points of contact between the metal particles and the metal fibers is decreased, so there is reduced formation of alloys in the fibers which serve to suppress cementation.

When metal powders having a low tendency to form carbides are employed, the metal fibers may be uncoated. Due to the effect of the addition of metal powder, a composite having a satisfactory strength can be obtained even if the metal fibers are uncoated. However, it is possible for all or part of the metal fibers to be coated so as to obtain a further increase in the bending strength. When coated metal fibers and metal powders are both employed, the metal constituting the coating and the metal constituting the metal powder can be the same or different from one another, as long as both metals have a tendency to form carbides which is equal to or lower than the metal constituting the metal fibers.

The metal powder may be simply added to the carbon raw material together with the metal fibers and then mixed by usual methods. However, the strength of the resulting composite can be increased if the metal fibers (either coated or uncoated) are first mixed alone with the metal powder in order to adhere the metal powder to the metal fibers, and then the metal fibers and metal powder are mixed with the carbon raw material. When mixing is performed in this manner, the bond strength between the metal powder and the metal fibers can be increased by the addition of a small quantity of a resinous or oily binder or a surfactant.

There is no particular restriction on the amount of metal powder which can be added. However, when the metal fibers are totally uncoated, the amount of metal powder is preferably 0.5-20 volume % and more preferably 1-10 volume % of the molding mixture. When the metal fibers are coated, the amount of metal powder can be decreased.

As mentioned above, the addition of a metal powder can suppress the cementation of the metal fibers through the formation of an alloy in the fibers during the baking stage of manufacture. Therefore, cementation of the metal fibers and an accompanying decrease in strength of the resulting composite can be prevented by using metal fibers the surface of which have been alloyed, prior to use, with a metal having a tendency to form carbides which is equal to or lower than the metal fibers.

One method of alloying prior to use is to coat the surface of the metal fibers, such as steel fibers, with one or more alloying metal such as copper, nickel, cobalt, aluminium, or silicon which have a low tendency to form carbides and then to heat the coated steel fibers at a high temperature to diffuse the alloying metal into the metal fibers to form an alloy at least near the surface of the metal fibers. Alternatively, uncoated metal fibers can be mixed with a metal powder containing predominantly one or more of the above alloying metals and then heated to a high temperature to perform alloying.

In either case, the heat treatment in order to perform alloying should be carried out at a temperature lower than the melting point of the metal fibers, but it should be carried out long enough and at high enough temperature for a substantial amount of the alloy element to diffuse into the metal fibers. When the metal fibers are steel fibers, heat treatment is preferably carried out at a temperature of approximately 600°–1100° C. for approximately 30 minutes–3 hours.

Even if heat treatment is not carried out in order to perform alloying prior to mixing of the fibers with the carbon raw material, during the baking stage in which the molding is baked in order to carbonize the carbon raw material, the metal fibers are exposed to a temperature equivalent to that used in the heat treatment for a considerable length of time. Therefore, if all or a portion of the metal fibers are coated with a metal having a low tendency to form carbides, and/or if a metal powder having a low tendency to form carbides is added to the metal fibers, then in the baking stage of manufacture, the coating or added metal powder will be alloyed with the metal fibers to a certain extent. As a result, the formation of cementite will be suppressed, and the strength will be improved.

According to one embodiment of this invention, metal fibers are blended with a carbonaceous raw material so as to orient the fibers in substantially unidirectional alignment. The metal fibers may be uncoated, or all or part of the fibers may be coated. If the metal fibers are aligned in this manner, the continuity of the metal fibers in the resulting carbon/metal composite is increased, so the electric resistance is enormously decreased, and the electrical properties of the composite are improved. Furthermore, the metal fibers effectively act as reinforcing members, so the impact resistance of the composite is greatly increased. Furthermore, in a bending test, even after the yield point is exceeded, the composite bends instead of failing, so it exhibits an extremely high bending strength.

The following methods can be used to orient the metal fibers so as to be substantially unidirectional in the carbon raw material.

(1) When the metal fibers are made of a ferromagnetic substance such as steel fibers, after a molding mixture of the metal fibers and the carbon raw material is placed into a mold, a magnetic field of at least several hundreds of Gauss is applied to the molding mixture. The magnetic field aligns the fibers in the direction of the field. After orientation has been performed, molding is carried out.

(2) When the metal fibers are made of copper or similar material which is not ferromagnetic, the metal fibers are formed into a cloth in which the warp length is far greater than the woof length so as to provide a substantial unidirectional orientation. The cloth is then laminated with the carbon raw material, placed into a mold, and molded.

(3) When the metal fibers are short with a length of at most 5 mm, a mixture of the carbon raw material and the short fibers is passed through slits having a width which is smaller than the length of the fibers. The mixture is then placed into a mold and molded.

(4) Molding is carried out by extrusion.

In another embodiment of the present invention, a mixture of at least two different types of metal fibers is used which differ from one another in one or more characteristics selected from their dimensions (length and diameter) and material. The fibers can be uncoated, or all or part of the fibers may be coated or alloyed with another material which has a tendency to form carbides which is equal to or lower than the metal constituting the fibers.

Many of the carbon/metal composites which have been proposed as a material for pantograph sliders in the prior art have a much higher electric resistance and a much lower impact strength than conventional sliders made from sintered metal. The drawbacks of conventional carbon/metal composites are due to the fact that the carbon matrix has a high electric resistance and a low impact strength. These problems can be overcome by increasing the content of metal fibers in a composite. However, as the metal content of a slider increases, the generation of sparks between the slider and trolley wires increases, and the wear of the trolley wires and the slider increases, which is undesirable.

As a result of investigations aimed at obtaining a carbon/metal composite having good wear resistance and good impact resistance without increasing the content of metal fibers, the following discoveries were made.

Metal fibers have a high aspect ratio, so they act as reinforcing members and increase the static strength and impact strength of a composite. For fibers having the same aspect ratio, the smaller the fiber diameter the higher is the static strength. In contrast, the impact strength increases with the length of the fibers, and if the aspect ratio is at least 10, the larger the fiber diameter the higher is the impact strength.

Furthermore, for fibers of the same material, it is well known that the higher the aspect ratio, the higher are the static strength and the impact strength of the composite containing the fibers. However, if the aspect ratio is too high, when the fibers are mixed with a carbon raw material, it becomes easy for the fibers to become entangled and form an agglomeration referred to as a fiber ball. In this case, it is necessary to reduce the fiber content, which is disadvantageous.

The present inventors found that the use of two or more different types of fibers is effective for increasing both the static and impact strength of a composite.

For example, if metal fibers having a small diameter are mixed with a small amount of long metal fibers having a large diameter, the static strength of the resulting composite is somewhat decreased, but the impact strength is enormously increased. A similar effect can be obtained by mixing two or more types of metal fibers having the same diameter but different lengths.

When combining metal fibers of different lengths, the ratio of the length of the longer fibers to the length of the shorter fibers is preferably at least 2. The amount of long fibers is preferably 10-40 parts by volume with respect to 100 parts by volume of short fibers.

It is also possible to mix metal fibers which are made of different materials. For example, if ferrous metal fibers which produce good wear resistance and mechanical strength are combined with copper fibers which have a low electric resistance, it is possible to obtain a composite having good wear resistance and mechanical strength as well as a low electric resistance. When using metal fibers made of two or more different materials, the materials can be chosen in accordance with the properties which are desired of the resulting composite.

In accordance with the present invention, it is also possible to vary one or more of the content, the material, or the dimensions (diameter or length) of the metal fibers along the thickness of the composite. The requirements of a composite with respect to wear resistance, impact resistance, and electric resistance may not be the same for both side of the composite. For example, the metal fibers may be distributed so as to be more concentrated near one surface of the composite which is desired to contain the fibers. When two or more different type of metal fibers are used, they may be distributed unevenly along the thickness such that each type of fibers are present so as to be more concentrated near one surface. Therefore, fibers which tend to improve a certain property can be provided in greater quantities near the surface of the composite which requires the property than near the other surface for which the property is less important. As the result, the overall properties of the composite can be improved over the composite in which the metal fibers are distributed uniformly throughout.

In the case of a pantograph slider, the electric resistance is extremely important. However, if the content of metal fibers is increased to obtain a low electric resistance, the wear resistance decreases, so it is difficult to obtain a satisfactory electric resistance and a satisfactory degree of wear resistance at the same time.

However, it is possible to obtain a composite having both a low electric resistance and good wear resistance by using two type of metal fibers of different materials which are present with distributions varying along the thickness of the composite rather than a uniform distribution throughout. The fibers which have a low electric resistance but which tend to lower the wear resistance are concentrated near one surface of the composite, while the other metal fibers are concentrated near the other surface.

In a pantograph slider, for example, the upper side which is in sliding contact with trolley wires requires good wear resistance and a low tendency to generate sparks. Therefore, ferrous metal fibers such as steel fibers and more preferably low-carbon steel fibers which provide good wear resistance can be provided in greater quantities in the upper portion. On the other hand, the lower portion of the slider which does not contact trolley wires can contain metal fibers such as copper fibers which have a low electric resistance. The resulting pantograph slider will have good wear resistance, a low electric resistance, and a low tendency to generate sparks.

By varying the distribution (content) of metal fibers along the thickness of a molding so that there are portions with many fibers and portions with few fibers, the impact resistance, wear resistance, and tendency to generate sparks of a composite can be simultaneously improved without an increase in the total amount of metal fibers which accompanies a deterioration in the wear resistance.

Again taking a pantograph slider as an example, the amount of metal fibers in the upper portion which contacts trolley wires can be reduced in order to improve wear resistance and decrease the generation of sparks, while in the lower portion which does not contact trolley wires, the amount of metal fibers can be increased in order to increase impact resistance and decrease the electric resistance. This type of slider has superior wear resistance and impact resistance and generates fewer sparks than a slider having a uniform distribution of metal fibers throughout.

When the content of metal fibers is varied in this manner, the content is preferably lower in the upper portion of the slider corresponding to the thickness which will be worn by sliding contact with the trolley wires than in the other portion. The content of metal fibers in the upper portion is preferably 10–40 volume % and more preferably 10–35 volume %, while the content of metal fibers in the other portion is preferably 40–65 volume % and more preferably 10–50 volume %.

It is also possible to employ two or more different types of metal fibers which differ from one another with respect to their dimensions (length and/or diameter) and to distribute the different types unevenly along the thickness of a composite. Such a composite has superior wear resistance, impact strength, and bending strength compared to a composite having the same content of metal fibers which are distributed uniformly throughout.

As mentioned above, when the material and content of metal fibers are constant, the longer are the metal fibers, the higher is the impact strength of the resulting composite. Furthermore, when the aspect ratio of the fibers is at least 10, the impact strength also increases as the fiber diameter increases. However, metal fibers which are long or have a large diameter decrease the wear resistance of the resulting composite.

For example, in the case of a pantograph slider made from a carbon/metal composite, it is effective to dispose short fibers with a small diameter in the upper portion of the slider, which contacts trolley wires, in order to increase its wear resistance, and it is effective to dispose long fibers with a large diameter in the lower portion which does not contact trolley wires in order to give it a high impact strength. In this case, the wear resistance and the impact strength of the slider are superior to those of a pantograph slider which is made from a composite containing metal fibers of a single size. Furthermore, the slider has less tendency to generate sparks.

Metal fibers which are effective in improving wear resistance preferably have a fiber diameter (equivalent diameter) of at most 0.3 mm and preferably at most 0.1 mm, and a length of at most 10 mm. Metal fibers which are effective in improving impact resistance have an equivalent diameter and a length which are both at least two times those of metal fibers which are effective in improving wear resistance. When the aspect ratio of metal fibers is greater than 10, the larger the fiber diameter the higher is the impact strength of the composite. However, if the fiber diameter (equivalent diameter) exceeds 1 mm, the bonding between the metal fibers and the carbon worsens, and there is a tendency for the bend strength to decrease. Therefore, the equivalent diameter of thicker metal fibers which are added for the purpose of increasing impact resistance preferably does not exceed 1 mm.

In a composite which is formed using a mixture of two or more different types of metal fibers which differ with respect to their dimensions and/or material, or in a composite in which at least one of the content, material, and dimensions is varied along the thickness of a composite, the metal fibers may be uncoated, or they may be coated or alloyed with another material having a tendency to form carbides which is equal to or lower than the metal fibers, just as in a composite which employs only a single type of metal fibers. Also, it is possible to add to the metal fibers a metal powder having such a low tendency to form carbides. As discussed previously, the use of coated or alloyed metal fibers or the addition of a metal powder increases the bending strength of the composite.

If desired, all or part of the different types of metal fibers can be oriented in substantially unidirectional alignment. For example, in a slider having ferrous metal fibers in the upper portion which contacts trolley wires and having copper fibers in the lower portion, the electrical properties of the composite can be improved by substantial unidirectional orientation of the copper fibers.

The carbon/metal composite of the present invention is prepared by mixing a carbon raw material with one or more types of metal fibers (all or a part of which may be coated or alloyed with another material as mentioned above) and an optional one or more metal powders, if any is used, to form a molding mixture, then molding the mixture, and baking the resulting molding to carbonize the carbon raw material.

In the mixing stage or molding stage of manufacture, the fibers can be oriented substantially unidirectionally in the manner described above. The content, material, and/or dimensions of the metal fibers can be varied along the thickness of the molding by preparing a plurality of mixtures of metal fibers and carbon raw materials, each mixture differing with respect to the content, material, or dimensions of the metal fibers present therein. The different mixtures can then be placed in a prescribed order into a mold and molded.

Molding can be performed by various conventional methods, such as extrusion, cold isostatic pressing (CIP), cold molding, or hot pressing. Of these methods, hot pressing using a binary carbon raw material (a mixture of coke powder and pitch) gives a composite with the highest strength and wear resistance.

During hot pressing, it is desirable to heat the molding mixture under pressure to a temperature at which the pitch will harden, i.e., at least 480° C. in order to obtain good strength and wear resistance in the resulting composite. Therefore, the heating temperature is preferably at least 480° C. and more preferably at least 500° C. The possible highest temperature during hot pressing is approximately 600° C. If this temperature is exceeded, then cracks tend to form in the molding. During at least a portion of the time when the mixture is being heated from room temperature to the hot pressing maximum temperature, a molding pressure of preferably at least 40 kg/cm$^2$ and more preferably at least 80 kg/cm$^2$ is applied to the mixture. If the molding pressure is less than 40 kg/cm$^2$, the bond strength between the binder and the metal fibers decreases, and there is a tendency of the wear resistance to decrease.

FIG. 1 is a schematic view of an example of a molding apparatus for hot pressing. In the FIGURE, 1 is a movable upper press head, 2 is a stationary lower press head, 3 is an upper mold, 4 is a lower mold, 5 is a metal frame, 6 is a molding mixture, 7 is a heating plate containing a sheath heater 7-1, and 8 is a thermal insulating member. After the molding mixture 6 is placed between the upper mold 3 and the lower mold 4, the heating plate 7 is heated by passing current through the sheath heater 7-1, and the molding mixture is pressed by the upper press head. The upper and lower molds can be preheated if desired.

The resulting molding is backed by heating it in a non-oxidizing atmosphere at a temperature below the melting point of the metal fibers. The baking carbonizes the carbon raw material, and a carbon/metal composite in which metal fibers are distributed in a carbon matrix is obtained. The baking temperature is preferably at least 900° C. so that the carbon can adequately exhibit its strength. However, if the baking temperature exceeds 1100° C., when the metal fibers are coated with another metal, the coating layer may melt and decrease in effectiveness. Furthermore, the metal fibers themselves may undergo a transformation which causes a decrease in the strength of the composite. Therefore, the baking temperature is preferably 900°-1100° C. and more preferably 950°-1050° C.

A carbon/metal composite according to the present invention is particularly suitable for use as a pantograph slider on account of its strength, wear resistance, and electrical properties. However, it can also be used for other types of sliding current collectors such as current collecting brushes, or for other types of sliding parts such as friction members for friction brakes, bearings, and sealing members.

The present invention will now be described in further detail be means of the following examples, which are given merely for the purpose of illustration.

In the examples, the softening point of the pitch which was used as a binder was measured using a flow tester manufactured by Shimadzu Seisakusho.

When the metal fibers were plated, the average plating thickness on the fibers was calculated on the basis of the nominal dimensions of the fibers, the coated weight of the plating, and the true specific gravities of the metal constituting the metal fibers and the plating metal.

The bending strength of the carbon/metal composites obtained in the examples are measured using test pieces of 10 mm × 60 mm × 10 mm thick in size cut from the composites. When the thickness of the molding is roughly 10 mm, the thickness of the test pieces was the same as the baked composite. The 60 mm side of the test piece was cut parallel to the lengthwise direction of the composite. The benign strength was then measured by a three-point bending test using a 40 mm span. The load during the bending test was applied in the same direction as the load was applied by the molding press during molding.

The impact strength was measured by a Charpy impact test using test pieces which measured 10 mm × 60 mm × 10 mm thick and which were cut in the manner described above. The direction of impact during the test was perpendicular to the direction of load applied by the molding press during molding.

Wear resistance of the composite was measured using a pin-on-disk wear tester. Test pieces measuring 8 mm long × 8 mm wide were used. The 8 mm × 8 mm surface was used for testing and was contacted with a copper plate having a diameter of 300 mm (diameter of contacting portion = 132 mm, roughness of contacting surface = 90 μm). The copper plate was forced to contact the test piece under a prescribed load and rotated for a prescribed length of time, after which the reduction in the thickness of the worn surface of the test piece was measured. The wear resistance was expressed as the reduction in thickness or as the amount of wear (worn volume) per 100 km of sliding.

The electric resistance was measured on test pieces measuring 10 mm wide × 60 mm long × 10 mm thick. Measurement was performed using the four-terminal method in which current was made to flow in the lengthwise direction of the test pieces.

EXAMPLE 1

In this example, a composite was manufactured using metal fibers coated with copper plating.

Regular grade petroleum coke was carbonized at 1000° C., after which it was placed into an oscillating mill containing stainless steel balls with a diameter of 10 mm. Grinding was performed for 4 hours to obtain coke powder with an average particle diameter of 11.5 μm, which was used as an aggregate of a binary carbon raw material for the preparation of a molding mixture.

Pitch, which was used as a binder, was obtained by heating coal tar under a reduced pressure of 60 mmHg at 440° C. for 1 hour. The resulting coal tar pitch had a softening point of 250° C. and was used after grinding to a size of 60 mesh or smaller.

The metal fibers were low carbon steel fibers (SPCC-1B) measuring 0.1 mm × 0.1 mm × 3 mm long. The steel fibers were immersed at room temperature in 80 times their weight of a plating solution having the composition shown in Table 1 for the time shown in Table 2 to form copper plating. The fibers were then removed from the plating solution, thoroughly washed with water, then rinsed with acetone, and dried in nitrogen at 100° C. to obtain copper-plated steel fibers. The average plating thickness is also shown in Table 2.

22 parts by weight of coke powder, 10 parts by weight of pitch as a binder, and 68 parts by weight of the steel fibers were mixed to prepare a molding mixture. The steel fibers constituted roughly 30 volume % of molding.

This molding mixture was molded using the hot press shown in FIG. 1. 350 g of the molding mixture were placed into a steel mold with an inner diameter of 100 mm. The molding mixture as heated without the application of pressure at a rate of 10° C./minute to 350° C. From 350° C., it was subjected to a pressure of 220 kg/cm² while being heated at a rate of 5° C./minute to 540° C. A pressure of 220 kg/cm² was then maintained at 540° C. for 1.5 hours. The resulting molding was removed from the mold after cooling.

The molding was then baked by placing it in coke powder and heating in a nitrogen gas atmosphere up to 480° C. at a rate of 100° C./hour. It was then maintained at 480° C. for 2 hours, after which it was heated at a rate of 15° C./hour to 1000° C. This temperature was maintained for 3 hours to carbonize the carbon raw material. After cooling, a carbon/steel composite was obtained.

The bending strength of the resulting composites is shown in Table 2. For comparison, the bending strength of a carbon/steel composite containing steel fibers which were not coated with copper plating is also shown in Table 2.

From Table 2, it can be seen that a composite containing steel fibers which are coated with a copper plating has a far higher bending strength than a composite containing uncoated steel fibers.

TABLE 1

| | |
|---|---|
| Distilled water | 1000 ml |
| Copper nitrate | 15 g |
| Sodium hydrogen carbonate | 10 g |
| Rochelle salt | 30 g |
| Sodium hydroxide | 20 g |
| Folmalin (37%) | 100 ml |

TABLE 2

| Run No. | | Duration of immersion (hr) | Average plating thickness (μm) | Bending strength (kg/cm²) |
| --- | --- | --- | --- | --- |
| Comparative | | — | — | 1070 |
| This | 1 | 0.5 | 0.09 | 1420 |
| Invention | 2 | 1.0 | 0.24 | 1590 |
| | 3 | 2.0 | 0.40 | 1720 |
| | 4 | 4.0 | 1.10 | 1670 |

EXAMPLE 2

In this example, a composite was manufactured using nickel-plated steel fibers.

The method of Example 1 repeated with exception that the steel fibers were plated with nickel plating instead of copper plating. Steel fibers like those used in Example 1 were plated by a non-electrolytic plating method using the plating solution shown in Table 3. Plating was performed by immersing the steel fibers in 100 times their weight of the plating solution for 20 minutes. During plating, the pH of the plating solution was adjusted to 9 by the addition of an aqueous ammonia, and the temperature was maintained at 85° C. After the completion of plating, the steel fibers were washed and dried in the same manner as in Example 1 to obtain nickel-plated steel fibers. The average thickness of the plating layer was 1.2 μm.

A carbon/metal composite containing 30 volume % of the nickel-plated steel fibers was then manufactured. It had a bending strength of 1800 kg/cm².

TABLE 3

| Distilled water | 1000 ml |
| --- | --- |
| Nickel chloride | 30 g |
| Sodium citrate | 100 g |
| Ammonium chloride | 50 g |
| Sodium hypophosphite | 10 g |

EXAMPLE 3

In this example, a composite was manufactured using both coated fibers and uncoated fibers.

Steel fibers like those used in Example 1 were immersed for 2 hours at 20° C. in 10 times their weight of a plating solution having the composition shown in Table 1. After immersion, they were washed and dried in the same way as in Example 1 to obtain copper-plated steel fibers. The average plating thickness was calculated to be approximately 0.5 μm.

The resulting copper-plated steel fibers, uncoated steel fibers, or a mixture of copper-plated and uncoated steel fibers were mixed with the same type of coke powder and pitch as were used in Example 1 in the proportions shown in Table 4 to form a molding mixture. In each case, the total amount of fibers was roughly 30 volume % of the molding. 450 g of each molding mixture were placed into a steel mold with inner dimensions of 100 mm × 100 mm and molded by hot pressing.

During molding, the temperature of the molding mixture was increased at a rate of 3° C./minute. From room temperature to 300° C., a pressure of 1 kg/cm² was applied, and from 300° C. to 550° C., a pressure of 200 kg/cm² was applied. After maintaining the temperature at 550° C. under a pressure of 200 kg/cm² for 1 hour, the resulting molding was cooled and removed from the mold.

The molding was baked for carbonization in the same manner as in Example 1 to obtain a carbon/metal composite. The bending strength of the composite was measured. A wear resistance test piece having an 8 mm × 8 mm testing (sliding) surface which was parallel to the surface of the press during molding was cut from the composite. A wear resistance test was performed by passing a 50 A, 60 Hz current between the testing surface of the test piece and a copper plate while rotating the copper plate at a speed of 100 km/hour under a load of 3 kg for 1 hour. Wear resistance was evaluated by measuring the reduction in the thickness of the testing surface. The results of measurements are shown in Table 4.

Examples 4 and 5 show the effects of the addition of metal powder to a composite.

EXAMPLE 4

A molding mixture was prepared using the same coke powder, pitch, and steel fibers (uncoated) as were used in Example 1. To these materials were added powder (JIS Grade 1) selected from copper powder (average particle diameter = 5 μm), nickel powder (average particle diameter = 10 μm), and cobalt powder (average particle diameter = 10 μm). The composition of the resulting molding mixture was 25 parts by weight of coke, 10 parts by weight of pitch, 55 parts by weight of steel fibers, and 10 parts by weight of metal powder. The steel fibers constituted about 25 volume % of the resulting moldings.

For comparison, molding mixtures were prepared using manganese powder and chromium powder as the metal powder. These powders have a greater tendency to form carbides then does iron. In addition, a molding mixture was prepared using 65 parts by weight of steel fibers without any metal powder.

These molding mixtures were molded and baked for carbonization in the same manner as in Example 1 to obtain carbon/steel composites. The bending strengths of the resulting composites are shown in Table 5.

As is clear from Table 5, composites containing a metal powder having a low tendency to form carbides had a much higher bending strength than composites which did not contain a metal powder. On the other hand, the addition of manganese or chromium powder resulted in a decrease in the bending strength compared to that of the composite containing no metal powder.

EXAMPLE 5

Molding mixtures containing copper powder were prepared in the same manner as in Example 4. The resulting moldings contained 25 volume % of steel fibers, and the amount of copper powder which was added was varied between 1–10 volume % while maintaining the total content of copper powder and coke powder at 53 volume %. The composition of each molding mixture and the bending strength of the resulting composite are shown in Table 6.

As is clear from Table 6, all of the resulting carbon/steel composites had a high bending strength. There was a substantial increase in bending strength even with the addition of as little as 0.5 volume % of copper powder.

EXAMPLE 6

In this example, both plated metal fibers and metal powder were employed.

Molding mixtures were prepared using the same coke powder, pitch, and copper-plated or uncoated steel fibers as used in Example 1, and the same nickel powder as employed in Example 4. Plating was performed by immersing steel fibers in 20 times their weight of the copper plating solution employed in Example 1 at 20° C. for 1 hour. The average plating thickness of the copper plating was 0.2 μm.

Molding mixtures having the compositions shown in Table 7 were prepared. 300 g of each molding mixture were placed into a steel mold with an inner diameter of 100 mm, and hot pressing was performed under the same conditions as in Example 3. The resulting moldings were packed in coke powder and heated in a nitrogen atmosphere from room temperature to 1000° C. at a rate of 100° C./hour. After being maintained at 1000° C. for 3 hours, the moldings were cooled. The bending strengths of the resulting carbon/steel composites are also shown in Table 7.

As is clear from Table 7, a composite containing both plated metal fibers and a metal powder has a particularly high bending strength.

Examples 7 and 8 illustrate the use of metal fibers which have been previously alloyed with a metal having a low tendency to form carbides.

EXAMPLE 7

Steel fibers like those used in Example 1 were plated with copper using the same plating solution as in Example 1. Plating was performed by immersing the fibers in 40 times their weight of the plating solution at 20° C. for 2 hours. The resulting copper plated fibers had a plating thickness of 0.6 μm.

The copper-plated steel fibers were placed into a porcelain crucible which was then packed with coke powder. The fibers were then heated in a nitrogen atmosphere to 1000° C. at a rate of 300° C./hour. After being maintained at 1000° C. for 2 hours, the fibers were cooled, and steel fibers alloyed with copper were obtained. These metal fibers were used to prepare a molding mixture.

The molding mixture comprises of 25 parts by weight of coke powder like that used in Example 1, 10 parts by weight of pitch like that used in Example 1 (prepared by heating at 450° C.), and 65 parts by weight of steel fibers alloyed with copper. The fibers constituted about 30 volume %. For comparison, a molding mixture containing uncoated fibers was also prepared.

The molding and baking were performed in the same manner as in Example 1 with the exception that 450 g of the molding mixtures were placed in the mold and that the molding pressure was 200 kg/cm². A resulting carbon/steel composite containing alloyed metal fibers had a bending strength of 1850 kg/cm², while a composite which contained uncoated metal fibers had a bending strength of 1250 kg/cm².

EXAMPLE 8

Steel fibers like those employed in Example 1 were placed into a rotary kiln together with twice their weight of nickel powder having an average particle diameter of 20 μm. While being rotated, the fibers and the powder were heated in a nitrogen atmosphere at a rate of 500° C./hour to 900° C., maintained at that temperature for 1 hour, and then cooled. The remaining nickel powder was separated from the steel fibers, which were now alloyed with nickel.

Using the steel fibers alloyed with nickel, a molding mixture was prepared. The preparation of the molding mixture, molding and baking were performed in the same manner as in Example 7. The resulting carbon/steel composite had a bending strength of 1980 kg/cm².

In Examples 9-12, carbon/metal composites were prepared using metal fibers oriented in substantially unidirectional alignment.

EXAMPLE 9

Low carbon steel fibers (SPCC-1B) measuring 0.05 mm×0.05 mm×3 mm long were immersed at room temperature in 80 times their weight of the copper plating solution used in Example 1, after which they were washed and dried. The resulting copper-plated steel fibers had an average plating thickness of either 0.3 μm or 0.5 μm.

68 parts by weight of the plated steel fibers were mixed with 22 parts by weight of coke powder having an average particle diameter of 15 μm and 10 parts by weight of pitch as binder which was ground to a size of 60 mesh or less to obtain a molding mixture. The coke powder was prepared by the same method as in Example 1. the pitch binder was obtained by heat treatment of coal tar under a reduced pressure of 100 mmHg at 440° C. for 2 hours and had a softening point of 240° C. The steel fibers constituted roughly 30 volume % of the molding mixture.

The molding mixture was then placed into a stainless steel mold with inner dimensions of 50 mm×80 mm. Enough molding mixture was used to obtain a molding having a final thickness of 10 mm. The steel fibers were oriented unidirectionally by applying a magnetic field of 50,000 Gauss to the molding mixture while vibrating the mold. The magnetic field was applied such that the line of the magnetic flux is parallel to the longer side (lengthwise direction) of the mold. Thereafter, molding by hot pressing was then performed with a hydraulic press having a 30-ton capacity. Under a molding pressure of 200 kg/cm², the molding mixture was heated at 5° C./minute to 550° C., maintained at that temperature for 1 hour, and then cooled. The resulting molding measured 50 mm wide×80 mm long×10 mm thick and contained copper-plated steel fibers which are aligned parallel to the length of the molding.

The molding was placed inside a stainless steel vessel which was packed with coke powder. The vessel was heated in a nitrogen atmosphere at a rate of 10° C./hour to 1000° C., maintained at that temperature for 4 hours, and then cooled to obtain a carbon/steel composite.

The bending strength and Charpy impact strength of the composite were measured. In addition, a test piece measuring 8 mm wide×8 long×10 mm thick was cut from the composite. One of the 8 mm×8 mm surfaces of the test piece corresponding to the upper surface of the molding was used as a test surface. A wear test was performed using a sliding speed of 100 km/hour (a copper plate rotating at 2000 rpm) under a load of 1.5 kg (2.34 kg/cm²) for 2 hours (200 km of sliding distance). The test piece was set in the wear tester so that the steel fibers aligned in the composite were perpendicular to the direction by sliding. Wear resistance was evaluated by determining the amount of wear (worn volume) of the test place per 100 km of sliding distance. The test results are shown in Table 8.

EXAMPLE 10

A composite containing steel fibers aligned unidirectionally was prepared in the same manner as in Example 9, with the exception that a mixture of uncoated steel fibers and plated steel fibers was employed. The uncoated steel fibers were the same as used in Example 9, while the plated steel fibers were obtained by performing nickel plating of the uncoated steel fibers using the same non-electrolytic nickel plating solution and the same plating method as in Example 2. The average thickness of the nickel plating was 1.2 µm. The steel fibers constituted 68 parts by weight of the molding mixture, in which 50 parts by weight were nickel-plated fibers and 18 parts by weight were the uncoated fibers.

The resulting composite had a bending strength of 2400 kg/cm$^2$, a Charpy impact strength of 18 kgcm/cm$^2$, and the amount of wear in the wear test was 11 mm$^3$/100 km.

EXAMPLE 11

A composite containing steel fibers aligned unidirectionally was prepared in the same manner as in Example 9, with the exception that the uncoated steel fibers were employed as the metal fibers and a metal powder selected from copper, nickel, and cobalt was added to the molding mixture. The molding mixture contained 19 parts by weight of coke powder, 9 parts by weight of pitch as a binder, 62 parts by weight of steel fibers, and 10 parts by weight of metal powder. The metal fibers constituted about 30 volume % and the metal powder constituted about 5 volume %.

The results of a bending strength test, a Charpy impact test, and a wear test are shown in Table 9.

EXAMPLE 12

A composite containing steel fibers aligned unidirectionally was prepared in the same manner as in Example 9, except that the uncoated steel fibers, copper-plated steel fibers, and/or nickel-plated steel fibers were used as metal fibers. In addition, a metal powder selected from copper, nickel, and cobalt metal powder was added to the molding mixture. The copper-plated steel fibers were obtained by immersing steel fibers in 20 times their weight of a plating solution and had an average plating thickness of 0.2 µm. The nickel-plated steel fibers were formed in the same manner as in Example 2 and had an average plating thickness of 1.2 µm. The compositions of the molding mixtures are shown in Table 10. The fibers constituted about 20 volume % and the metal powder constituted about 5 volume %.

The results of a bending strength test, a Charpy impact test, and a wear test are also shown in Table 10.

EXAMPLE 13

In this example, a carbon/metal composite was manufactured using two or more types of metal fibers made of different materials or having different dimensions.

Coke powder having an average particle diameter of 12 µm and pitch binder which was ground to a size of 60 mesh or less were used as carbon raw materials. The coke powder was obtained by the same method as in Example 1. The pitch binder was obtained by heating coal tar under an absolute pressure of 60 mmHg at 430° C. for 2 hours. It had a softening point of 270° C. The carbon raw materials were mixed with 1 or 2 types of metal fibers selected from the following list in the proportions shown in Table 11 to obtain a molding mixture.

Types of metal fibers (a) low carbon steel fibers: 0.05 mm × 0.05 mm × 3 mm long
(b) low carbon steel fibers: 0.1 mm × 0.1 mm × 6 mm long
(c) low carbon steel fibers: 0.5 mm × 0.5 mm × 25 mm long
(d) copper fibers: 0.05 mm × 0.05 mm × 3 mm long Each molding mixture was placed into a mold having inner dimensions of 100 mm × 200 mm. Under a pressure of 200 kg/cm$^2$, the temperature of the molding mixture was raised at a rate of 5° C./min to 500° C. and maintained at that temperature for 1 hour. After cooling, moldings measuring 100 mm × 200 mm × 10 mm thick was removed from the mold. The moldings were placed in a coke powder in a nitrogen atmosphere, heated at a rate of 12° C./hour to 1000° C., maintained at that temperature for 4 hours, and then cooled to obtain carbon/steel composites.

Measurements of the bending strength, the charpy impact strength, the wear resistance, and the electric resistance are also shown in Table 11. Wear resistance was measured under the same conditions as in Example 9. As shown in Table 11, a composite containing a mixture of two different types of metal fibers has excellent wear resistance and impact resistance, and a low electric resistance.

EXAMPLE 14

In this example, a carbon/metal composite was manufactured using two types of metal fibers made of different materials which were disposed in different portions of the composite along its thickness.

Coke powder having an average particle diameter of 12 µm and a binder pitch having a softening point of 250° C. and ground to a size of 60 mesh or less were used as carbon raw materials. The coke powder was the same as that used in Example 13. The pitch was obtained by heat treatment of coal tar under absolute pressure of 100 mmHg at 420° C. for 6 hours. Two kinds of metal fibers used were: (a) low carbon steel fibers and (b) copper fibers both measuring 0.05 mm × 0.05 mm × 3 mm long.

Fibers (a) and (b) were separately mixed with the carbon raw materials in the proportions shown in Table 12 to obtain four types of molding mixtures A-D. Two of the four types of mixtures were then stacked one above the other in a mold having internal dimensions of 100 mm × 200 mm. Each mixture was used in an amount sufficient to give a thickness of 5 mm after molding so that a molding having a thickness of about 10 mm and containing different types of fibers between the upper half and the lower half was formed.

Molding and baking were performed in the same manner as in Example 13 except that the hot pressing temperature was 550° C., and carbon/steel composites were obtained.

The types of molding mixtures used in each composite along with the bending strength, the wear resistance, and the electric resistance of the resulting composites are shown in Table 13 below. Wear resistance was measured in the same manner as in Example 9 except that the test surface of the test piece was the upper surface of the molding which is perpendicular to the pressing direction during molding. It can be seen that the resulting composites all had excellent wear resistance and a low electric resistance.

EXAMPLE 15

In this example, a carbon/metal composite was manufactured in which the content of steel fibers was varied along the thickness of the composite.

The same coke powder as used in Example 13 (average particle diameter=12 μm), the same pitch binder used in Example 14, and low carbon steel fibers measuring 0.05 mm×0.05 mm×3 mm long were mixed in the proportions shown in Table 14 below to obtain four different molding mixtures A-D having different contents of steel fibers. Two of the four types of mixtures were stacked one above the other in a mold with internal dimensions of 100 mm×200 mm each to a depth sufficient to give a thickness of 5 mm after molding. Thus, the content of metal fibers was different for the upper and lower portions of the mold.

The molding mixtures were hot pressed and baked in the same manner as in Example 14 to obtain carbon/steel composites having a thickness of about 10 mm.

The types of molding mixtures employed in each composite and the bending strength, wear resistance, and Charpy impact strength are shown in Table 15. The wear resistance was measured in the same manner as in Example 14. From Table 15, it can be seen that the composites according to the present invention had excellent wear resistance and impact strength.

EXAMPLE 16

In this example, carbon/metal composites were manufactured in which the dimensions of the metal fibers varied along the thickness of the composite.

The same coke powder and pitch binder as in Example 9 were used as carbon raw materials. These were mixed with one of the following three types of steel fibers having different dimensions in the proportions given in Table 16 below to obtain six different types of molding mixtures A-F. The dimensions of the three different types of fibers were as follows:

(a) 0.05 mm×0.05 mm×3 mm long (eq.D=0.056 mm)

(b) 0.1 mm×0.1 mm×6 mm long (eq.D=0.113 mm)

(c) 0.5 mm×0.5 mm×25 mm long (eq.D=0.564 mm)

(eq.D: equivalent diameter)

Two of the six types of mixtures were stacked one above the other in a mold having internal dimensions of 100 mm×200 mm each to a depth sufficient to give a thickness of 5 mm after molding. A mixture containing longer and thicker fibers was placed in the lower half while a mixture containing shorter and thinner fibers was placed in the upper half of the mold.

The molding mixtures were molded by hot pressing and baked under the same conditions as in Example 14 to obtain carbon/steel composites having a thickness of about 10 mm.

The types of molding mixtures employed in each composite along with the electric resistance, bending strength, wear resistance, and Charpy impact strength of the composites are shown in Table 17 below. The wear resistance was measured in the same manner as in Example 9. As is clear from Table 17, the composites had excellent wear resistance and impact strength.

While the invention has been described with reference to the foregoing embodiments, various changes and modifications can be made thereto which fall within the scope of the appended claims.

TABLE 4

| Run No. | | Parts by weight | | | | Properties | | |
| --- | --- | --- | --- | --- | --- | --- | --- | --- |
| | | Uncoated steel fiber | Cu-plated steel fiber | Coke powder | Pitch | Bending strength (kg/cm$^2$) | Density (g/cm$^2$) | Electric resistance (μΩcm) | Reduction in thickness after wear test (mm) |
| 1 | This invention | 42 | 100 | 48 | 22 | 1850 | 3.6 | 110 | 0.20 |
| 2 | Comparative | 142 | — | 48 | 22 | 1210 | 3.7 | 120 | 0.18 |
| 3 | This invention | — | 142 | 48 | 22 | 1650 | 3.8 | 95 | 0.30 |

TABLE 5

| Run No. | | Metal powder | Bending strength (kg/cm$^2$) | Remarks |
| --- | --- | --- | --- | --- |
| This Invention | 1 | Copper | 1710 | Metal powder with tendency to form carbides equal to or lower than iron |
| | 2 | Nickel | 1940 | |
| | 3 | Cobalt | 1800 | |
| Comparative | 4 | Steel fibers | 1250 | No metal powder |
| | 5 | Manganese | 440 | Metal powder with tendency to form carbides greater than iron |
| | 6 | Chromium | 1170 | |

TABLE 6

| Run No. | | Parts by weight (Volume percent in parentheses) | | | | Bending strength (kg/cm$^2$) |
| --- | --- | --- | --- | --- | --- | --- |
| | | Steel fiber | Cu powder | Coke powder | Pitch | |
| This Invention | 1 | 25 (120) | 10 (56) | 43 (43) | 22 (22) | 1640 |
| | 2 | 25 (120) | 5 (28) | 48 (48) | 22 (22) | 1710 |
| | 3 | 25 (120) | 2 (11.2) | 51 (51) | 22 (22) | 1670 |
| | 4 | 25 (120) | 1 (5.6) | 52 (52) | 22 (22) | 1720 |
| | 5 | 25 (120) | 0.5 (2.8) | 52.5 (52.5) | 22 (22) | 1510 |

TABLE 7

| Run No. | | Parts by weight | | | | | Bending strength (kg/cm$^2$) |
| --- | --- | --- | --- | --- | --- | --- | --- |
| | | Cu-plated steel fiber | Uncoated steel fiber | Ni powder | Coke powder | Pitch | |
| This invention | 1 | 120 | — | 10 | 48 | 22 | 2010 |
| | 2 | — | 132 | 10 | 48 | 22 | 1750 |
| | 3 | 32 | 100 | 10 | 48 | 22 | 1980 |
| Comparative | 4 | — | 142 | — | 48 | 22 | 1210 |

TABLE 7-continued

| Run No. | | Cu-plated steel fiber | Uncoated steel fiber | Ni powder | Coke powder | Pitch | Bending strength (kg/cm²) |
|---|---|---|---|---|---|---|---|
| | | Parts by weight | | | | | |
| This invention | 5 | 142 | — | — | 48 | 22 | 1650 |

TABLE 8

| Run No. | | Unidirectional orientation | Average plating thickness (μm) | Bending strength (kg/cm²) | Charpy impact strength (kgcm/cm²) | Amount of wear (mm³/100 km) |
|---|---|---|---|---|---|---|
| This invention | 1 | Oriented | 0.3 | 2050 | 15 | 10 |
| | 2 | " | 0.5 | 2250 | 17 | 12 |
| Comparative | 1 | None | — | 1050 | 5 | 11 |
| | 2 | Oriented | — | 1450 | 12 | 12 |

TABLE 9

| Run No. | | Unidirectional orientation | Metal powder added | Bending strength (kg/cm²) | Charpy impact strength (kgcm/cm²) | Amount of wear (mm³/100 km) |
|---|---|---|---|---|---|---|
| This invention | 1 | Oriented | Copper | 2300 | 18 | 9 |
| | 2 | " | Nickel | 2550 | 20 | 13 |
| | 3 | " | Cobalt | 2350 | 17 | 12 |
| Comparative | 1 | None | — | 1050 | 5 | 11 |
| | 2 | Oriented | — | 1450 | 12 | 12 |

TABLE 10

| | Unidirectional orientation | Steel fiber Cu-plated | Steel fiber Ni-plated | Steel fiber Uncoated | Metal powder | Coke powder | Pitch | Bending strength (kg/cm²) | Amount of wear (mm³/100 km) |
|---|---|---|---|---|---|---|---|---|---|
| | | Volume percent (parts by weight in parentheses) | | | | | | | |
| 1 | Oriented | 20 (100) | — | — | Ni: 5 (28) | 52 (52) | 23 (23) | 2700 | 9.0 |
| 2 | " | 10 (50) | — | 10 (50) | Ni: 5 (28) | 52 (52) | 23 (23) | 2300 | 8.5 |
| 3 | " | 10 (50) | — | 10 (50) | Cu: 5 (29) | 52 (52) | 23 (23) | 1850 | 5.2 |
| 4 | " | 20 (100) | — | — | Co: 5 (28) | 52 (52) | 23 (23) | 1900 | 8.1 |
| 5 | " | — | 20 (100) | — | Cu: 5 (29) | 52 (52) | 23 (23) | 2600 | 7.3 |
| 6 | " | 10 (50) | — | 10 (50) | Cu: 2.5 Ni: 2.5 (14) (14) | 52 (52) | 23 (23) | 2100 | 8.1 |
| 7 | " | 10 (50) | 10 (50) | — | Cu: 5 (29) | 52 (52) | 23 (23) | 1950 | 6.7 |
| 1 | None | — | — | 20 (100) | — | 57 (52) | 23 (23) | 750 | 7.2 |
| 2 | Oriented | — | — | 20 (100) | — | 57 (52) | 23 (23) | 1350 | 8.4 |

TABLE 11

| Run No. | | Fiber (a) | Fiber (b) | Fiber (c) | Fiber (d) | Coke powder | Pitch | Bending strength (kg/cm²) | Amount of wear (mm³/100 km) | Charpy impact strength (kgcm/cm²) | Electric resistance (μΩcm) |
|---|---|---|---|---|---|---|---|---|---|---|---|
| | | Volume percent | | | | | | | | | |
| This invention | 1 | 20 | 10 | | | 49 | 21 | 1140 | 12 | 6.7 | 100 |
| | 2 | 20 | | 10 | | 49 | 21 | 1070 | 15 | 14.0 | 102 |
| | 3 | 20 | | | 10 | 49 | 21 | 1120 | 16 | 4.6 | 48 |
| | 4 | | 20 | 10 | | 49 | 21 | 1130 | 18 | 16.2 | 96 |
| Comparative | 5 | 30 | | | | 49 | 21 | 1200 | 11 | 5.0 | 105 |
| | 6 | | 30 | | | 49 | 21 | 1090 | 14 | 7.2 | 98 |
| | 7 | | | 30 | | 49 | 21 | 820 | 27 | 19.0 | 96 |
| | 8 | | | | 30 | 49 | 21 | 980 | 44 | 4.3 | 30 |

TABLE 12

| Blend | Steel fiber | Copper fiber | Coke powder | Pitch |
|---|---|---|---|---|
| | Volume percent | | | |
| A | 0 | 30 | 48 | 22 |
| B | 0 | 40 | 38 | 22 |
| C | 30 | 0 | 48 | 22 |
| D | 40 | 0 | 38 | 22 |

TABLE 13

| Run No. | | Combination of blends Upper | Combination of blends Lower | Bending strength (kg/cm²) | Amount of wear (mm³/100 km) | Electric resistance (μΩcm) |
|---|---|---|---|---|---|---|
| This invention | 1 | C | A | 1090 | 13 | 48 |
| | 2 | D | A | 1150 | 12 | 32 |
| | 3 | C | B | 1230 | 12 | 45 |
| | 4 | D | B | 1290 | 13 | 31 |
| Comparative | 5 | A | A | 940 | 35 | 30 |
| | 6 | B | B | 1020 | 48 | 20 |
| | 7 | C | C | 1220 | 12 | 110 |
| | 8 | D | D | 1450 | 13 | 90 |

TABLE 14

| Blend | Volume percent Coke powder | Volume percent Fiber | Volume percent Pitch |
|---|---|---|---|
| A | 48 | 30 | 22 |
| B | 38 | 40 | 22 |
| C | 28 | 50 | 22 |
| D | 18 | 60 | 22 |

TABLE 15

| Run No. | | Combination of blends Upper | Combination of blends Lower | Bending strength (kg/cm²) | Amount of wear (mm³/100 km) | Charpy impact strength (kgcm/cm²) |
|---|---|---|---|---|---|---|
| This invention | 1 | A | C | 1240 | 13 | 10.7 |
| | 2 | A | D | 1480 | 12 | 12.7 |
| | 3 | B | C | 1520 | 12 | 11.2 |
| Comparative | 4 | A | A | 1090 | 12 | 7.3 |
| | 5 | B | B | 1360 | 13 | 8.2 |
| | 6 | C | C | 1450 | 18 | 12.4 |
| | 7 | D | D | 1540 | 29 | 15.2 |

TABLE 16

| Blend | Fiber size (Equivalent diameter × length) (mm) | Volume percent Fiber | Volume percent Coke powder | Volume percent Pitch |
|---|---|---|---|---|
| A | 0.056 × 3 | 30 | 50 | 20 |
| B | 0.113 × 6 | | | |
| C | 0.564 × 30 | | | |
| D | 0.056 × 3 | 40 | 40 | 20 |
| E | 0.113 × 6 | | | |
| F | 0.564 × 30 | | | |

TABLE 17

| Run No. | | Combination of blends Upper | Combination of blends Lower | Amount of wear (mm³/100 km) | Charpy impact strength (kgcm/cm²) | Bending strength (kg/cm²) | Electric resistance (μΩcm) |
|---|---|---|---|---|---|---|---|
| This invention | 1 | A | B | 11 | 7.2 | 1100 | 80 |
| | 2 | A | C | 11 | 13.1 | 1003 | 83 |
| | 3 | D | E | 13 | 10.6 | 1380 | 68 |
| | 4 | D | F | 12 | 19.2 | 1220 | 70 |
| Comparative | 5 | A | A | 11 | 5.1 | 1120 | 82 |
| | 6 | B | B | 18 | 7.8 | 1010 | 80 |
| | 7 | C | C | 86 | 20.2 | 850 | 105 |
| | 8 | D | D | 13 | 9.2 | 1430 | 69 |
| | 7 | E | E | 22 | 12.0 | 1260 | 73 |
| | 8 | F | F | 140 | 28.0 | 930 | 70 |

What is claimed is:

1. A carbon/metal composite comprising a carbon matrix and metal fibers distributed in the carbon matrix, the surfaces of at least a portion of the metal fibers being coated or alloyed with a metal having a tendency to form carbides equal to or less than the metal fibers and which suppresses formation of carbides in the metal fibers.

2. A carbon/metal composite as claimed in claim 1, wherein the metal fibers are those of rod-shaped, needle-shaped, wedge-shaped, wave-shaped, net-shaped, or a mixture of these shapes.

3. The carbon/metal composite of claim 1, wherein the composite has a bending strength of at least 1420 kg/cm².

4. The carbon/metal composite of claim 1, wherein the composite has an impact strength of at least 15 kgcm/cm².

5. The carbon/metal composite of claim 1, wherein the composite has a wear resistance of less than 13 mm³ per 100 km of sliding distance wherein a test surface of the composite is rotated at 100 km/hour against a copper plate rotating at 2000 rpm under a load of 1.5 kg.

6. The carbon/metal composite of claim 1, wherein the composite has an electrical resistance of less than 110 μΩcm.

7. The carbon/metal composite of claim 1, wherein the fibers have a diameter of no greater than 0.5 mm and a length of at least 1 mm.

8. The carbon/metal composite of claim 1, wherein the fibers have a diameter of no greater than 0.3 mm and a length of at least 3 mm.

9. The carbon/metal composite of claim 1, wherein the fibers have an aspect ratio of at least 10.

10. The carbon/metal composite of claim 1, wherein the fibers are present in an amount of at least 10% by volume of the composite.

11. The carbon/metal composite of claim 1, wherein the fibers are present in an amount of 10 to 40% by volume of the composite.

12. The carbon/metal composite of claim 1, wherein the material coated on the fibers has a thickness of at least 0.1 μm.

13. The carbon/metal composite of claim 1, wherein at least 50% by weight of the fibers are coated.

14. A carbon/metal composite comprising a carbon matrix and metal fibers distributed in the carbon matrix, the surfaces of at least a portion of the metal fibers being coated or alloyed with a metal having a tendency to form carbides equal to or less than the metal fibers and which suppresses formation of carbides in the metal fibers, said metal fibers being steel fibers and said barrier metal being one or more metals selected from the group consisting of copper, nickel, cobalt, aluminum, and silicon.

15. A carbon/metal composite as claimed in claim 14, wherein a steel fibers are low carbon steel fibers.

16. A carbon/metal composite comprising a carbon matrix and metal fibers distributed in the carbon matrix, the surfaces of at least a portion of the metal fibers being coated or alloyed with a material having a tendency to form carbides equal to or less than the metal fibers and which suppresses formation of carbides in the metal fibers, the surface of at least a portion of the metal fibers being coated with said material.

17. A carbon/metal composite as claimed in claim 1, wherein the surface of at least a portion of the metal fibers is alloyed with said metal.

18. A carbon/metal composite as claimed in claim 1, wherein the metal fibers are distributed in the composite so as to be substantially undirectional with respect to each other.

* * * * *

UNITED STATES PATENT AND TRADEMARK OFFICE
CERTIFICATE OF CORRECTION

PATENT NO. : 5,158,828

DATED : October 27, 1992

INVENTOR(S) : Kiyoshi SUDANI et al

It is certified that error appears in the above-identified patent and that said Letters Patent is hereby corrected as shown below: On the title page:

In Section [30], add the following:

"Sept. 25, 1989 [JP]    Japan...........................1-249962"

Signed and Sealed this

Twenty-fifth Day of January, 1994

Attest:

BRUCE LEHMAN

Attesting Officer         Commissioner of Patents and Trademarks